United States Patent [19]

Sugiki et al.

[11] Patent Number: 5,522,770
[45] Date of Patent: Jun. 4, 1996

[54] DRIVING APPARATUS HAVING A JOINT MEMBER AROUND WHICH IS WOUND AN URGING MEMBER

[75] Inventors: Akio Sugiki, Kariya; Masanobu Ishikawa, Nagoya, both of Japan

[73] Assignee: Aisin Seiki Kabushiki Kaisha, Kariya, Japan

[21] Appl. No.: 67,938

[22] Filed: May 27, 1993

[30] Foreign Application Priority Data

May 29, 1992 [JP] Japan .................... 4-138716

[51] Int. Cl.⁶ .................................... F16D 3/00
[52] U.S. Cl. ...................... 464/87; 464/51; 464/185
[58] Field of Search .................. 464/51, 57, 87, 464/102, 97, 185, 153, 104, 55, 56, 147, 92, 106; 74/493

[56] References Cited

U.S. PATENT DOCUMENTS

| | | | |
|---|---|---|---|
| 1,411,433 | 4/1922 | Higgins . | |
| 1,525,026 | 2/1925 | Dickerman | 464/51 X |
| 1,950,448 | 3/1934 | Heisterkamp | 464/57 |
| 2,034,002 | 4/1936 | Ricefield . | |
| 2,254,566 | 9/1941 | Cornell, Jr. | 464/57 |
| 2,499,549 | 3/1947 | Walker | 188/212 |
| 3,252,350 | 5/1966 | Zeigler . | |
| 3,831,460 | 8/1974 | Linley, Jr. | 74/459 |
| 4,332,148 | 6/1982 | Maki et al. | 464/102 |
| 4,452,592 | 6/1984 | Tsai | 464/102 |
| 4,543,848 | 10/1985 | Beauch . | |
| 4,547,175 | 10/1985 | Tangorra et al. | 464/56 |
| 4,633,732 | 1/1987 | Nishikawa et al. | 74/493 |
| 4,716,780 | 1/1988 | Nishikawa et al. | 74/493 |
| 4,753,122 | 6/1988 | Nishikawa et al. | 74/424.8 A |
| 4,838,511 | 6/1989 | Terada et al. | 248/429 |
| 4,966,045 | 10/1990 | Harney | 74/424.8 A |
| 5,027,671 | 7/1991 | Erikson et al. | 74/441 |
| 5,123,311 | 6/1992 | Dymek | 464/57 X |
| 5,226,852 | 7/1993 | Asaba et al. | 464/104 |

FOREIGN PATENT DOCUMENTS

| | | |
|---|---|---|
| 3610284 | 12/1990 | Germany . |
| 64-68979 | 10/1962 | Japan . |
| 59-230861 | 12/1984 | Japan . |
| 63-34252 | 2/1988 | Japan . |
| 1581903 | 7/1990 | U.S.S.R. .................. 464/51 |
| 2141520 | 12/1984 | United Kingdom . |

*Primary Examiner*—Daniel P. Stodola
*Assistant Examiner*—Emmanuel M. Marcelo
*Attorney, Agent, or Firm*—Burns, Doane, Swecker & Mathis

[57] ABSTRACT

A driving appratus which includes a driving shaft which is linked to a driving member, a driven shaft which is connected with the driving shaft and which is linked to a driven member, a joint member which connects the driving shaft with the driven shaft so that a torque is transmitted from the driving shaft to the driven shaft while absorbing the eccentricity between both shafts and an urging member which is disposed to the joint member and which urges the joint member in the axial and rotational direction in regard to the both shafts. According to this improved driving appratus, the joint member rotates under the condition which is urged by the urging member in the axial and rotational direction in regard to the driving shaft and the driven shaft and transmitts the torque from the driving shaft to the driven shaft. Therefore, it is able to effectively absorb the vibration between the driving shaft and the driven shaft by the urging member and therefore it is able to prevent the generation of the uncomfortable noise and so on due to the vibration.

2 Claims, 5 Drawing Sheets

DRIVING APPARATUS HAVING A JOINT MEMBER AROUND WHICH IS WOUND AN URGING MEMBER

BACKGROUND OF THE INVENTION

1. Field of the Invention

The present invention relates to a driving apparatus including a joint member which connects a driving shaft with a driven shaft so that torque is transmitted from the driving shaft to the driven shaft while absorbing the eccentricity between both shafts, and to a driving apparatus which is employed as a driving apparatus of a position adjusting mechanism for a steering device or a seat device.

2. Description of the Prior Art

A conventional driving apparatus of this kind is disclosed, for example, in Japanese Patent Laid-Open Publication No. 63(1988)-34252. This driving apparatus includes a driving shaft rotated as an output shaft of a motor, a driven shaft which is connected with the driving shaft and on which a worm-gear is fixed, a joint member which connects the driving shaft with the driven shaft so that torque is transmitted from the driving shaft to the driven shaft while absorbing the eccentricity between both shafts. Furthermore, this driving apparatus includes a first groove portion formed on the joint member, a first wall portion formed on the driving shaft and fitted into the first groove portion so as to be able to move in the diametrical direction and engaged with the first groove portion, a second groove portion formed on the joint member so as to meet with the first groove portion at a right angle and a second wall portion formed on the driven shaft and fitted into the second groove portion so as to be able to move in the diametrical direction and engaged with the second groove portion. Thereby, the eccentricity between the driving shaft and the driven shaft is absorbed by the movement of the first and second wall portions of the diametrical direction in regard to the first and second groove portions, respectively. Simultaneously, the torque is transmitted from the driving shaft to the driven shaft via the engagement between the first and second wall portions and the first and second groove portions, respectively.

In the above conventional driving apparatus, however, since a predetermined clearance is formed between the first and second wall portions and the first and second groove portions so that the first and second wall portions are able to move in the diametrical direction in regard to the first and second groove portions, respectively, a vibration is generated between the driving shaft and the joint member and between the driven shaft and the joint member by the clearance, respectively. Thereby, there is a danger an uncomfortable noise and so on is caused by the vibration.

SUMMARY OF THE INVENTION

It is, therefore, an object of the present invention to provide an improved driving apparatus which overcomes the above drawback.

It is another object of the present invention to decrease the vibration which is generated between the driving shaft and the joint member and between the driven shaft and the joint member.

In order to achieve these objects, there is provided a driving apparatus which includes a driving shaft which is linked to a driving member, a driven shaft which is connected with the driving shaft and which is linked to a driven member, a joint member which connects the driving shaft with the driven shaft so that a torque is transmitted from the driving shaft to the driven shaft while absorbing the eccentricity between both shafts and an urging member which is disposed to the joint member and which urges the joint member in the axial and rotational direction in regard to the both shafts.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENT

A driving apparatus in accordance with a preferred embodiment of the present invention will be described with reference to the attached drawings.

Figure 1:
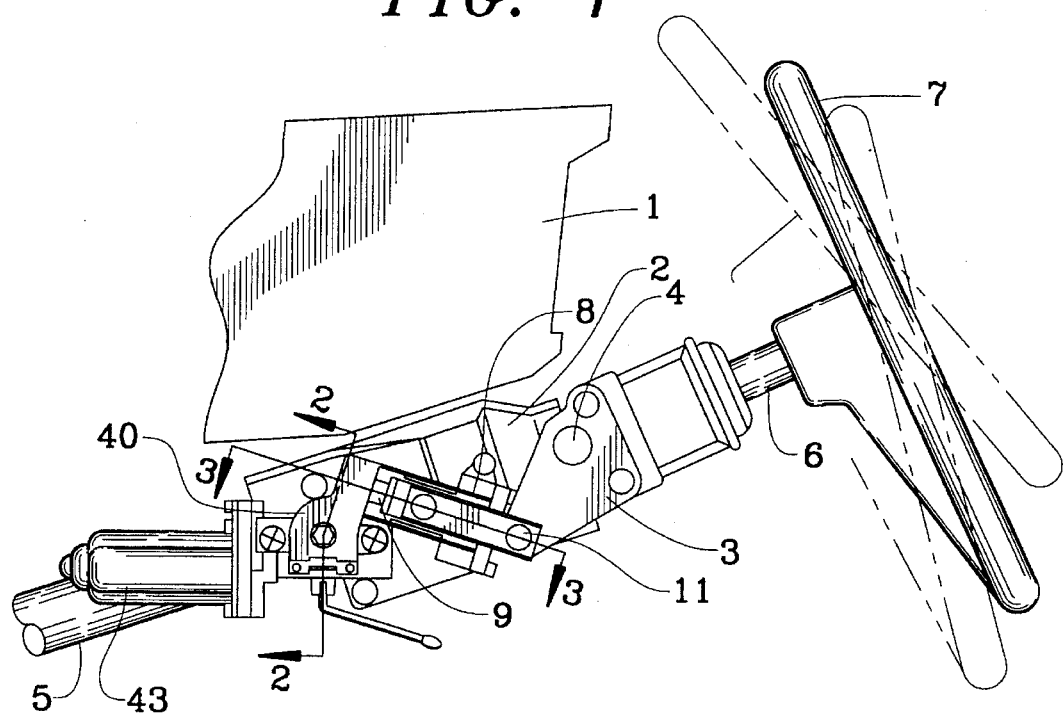
FIG. 1 is a side view of one embodiment of a driving apparatus with a steering device in accordance with the present invention.

Referring to FIG. 1, a breakaway bracket 2 is fixed to vehicle's body and an upper bracket 3 is rotatably supported on the breakaway bracket 2 by a pin 4. A lower main shaft 5 is rotatably supported on the breakaway bracket 2 and an upper main shaft 6 is rotatably supported on the upper bracket 3. The upper main shaft 6 is connected with the lower main shaft 5 via an universal-joint (not shown) which is coaxially disposed to the pin 4 and a steering wheel 7 is fixed to a top end of the upper main shaft 6.

Figure 2:
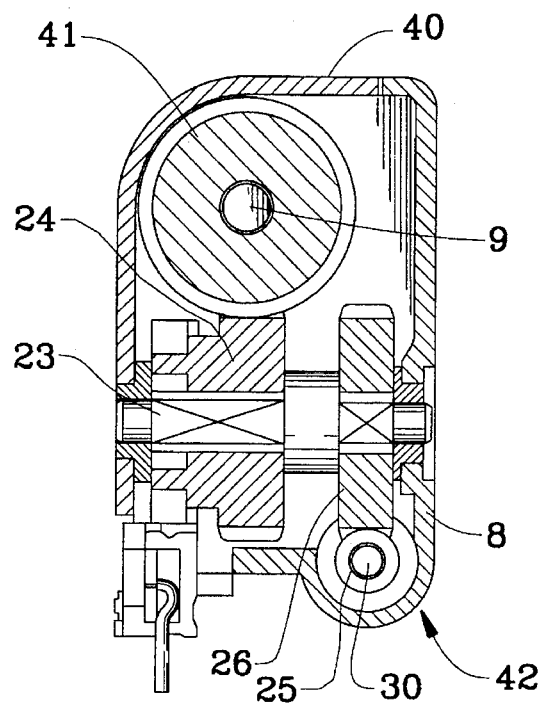
FIG. 2 is a sectional view taken substantially along the section line 2—2 of FIG. 1.
Figure 3:
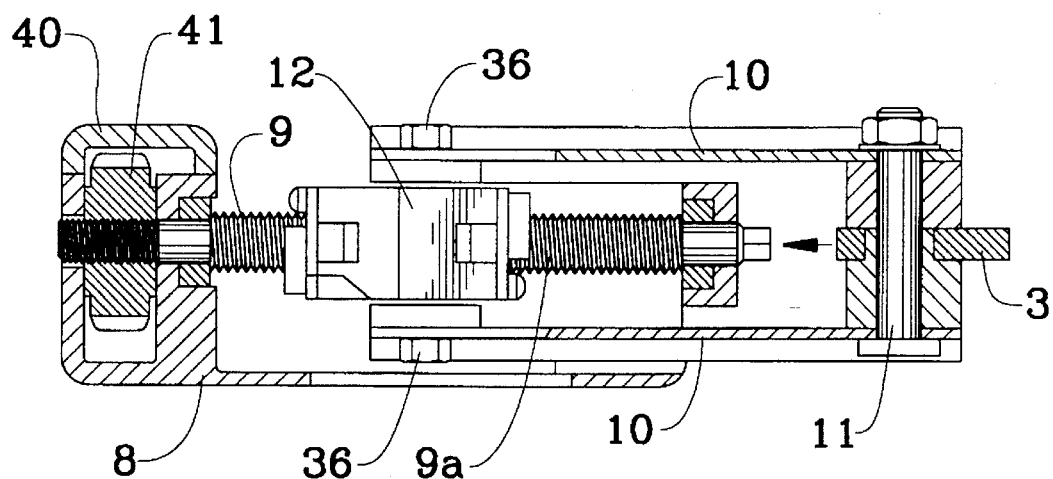
FIG. 3 is a sectional view taken substantially along the section line 3—3 of FIG. 1.
Figure 4:
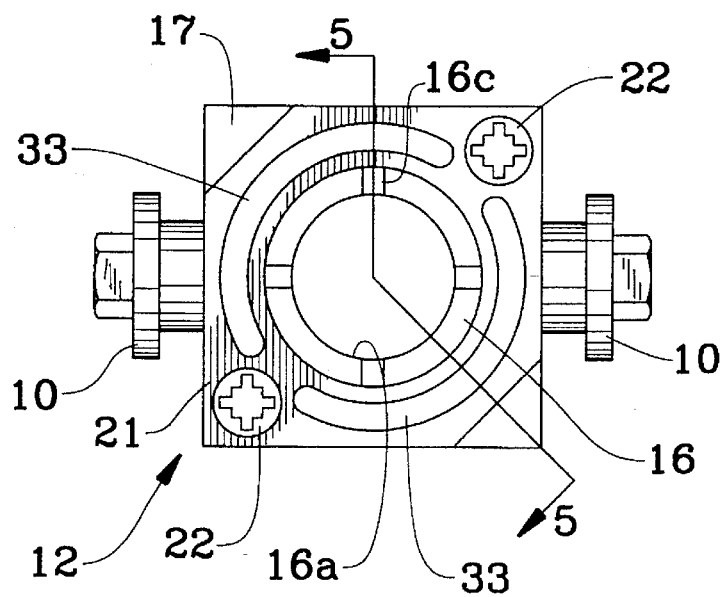
FIG. 4 is front view of a nut member of an embodiment of a driving apparatus in accordance with the present invention.
Figure 5:
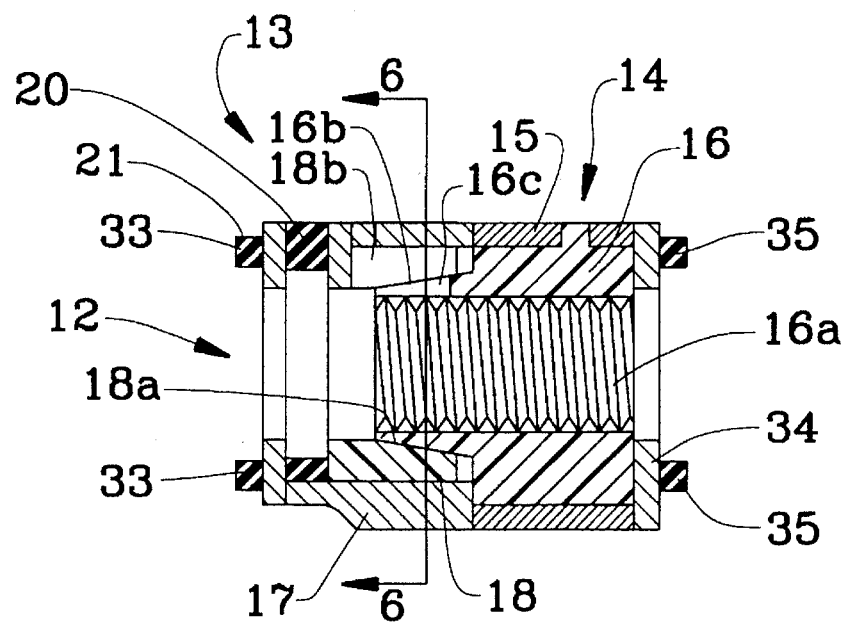
FIG. 5 is a sectional view taken substantially along the section line 5—5 of FIG. 4.
Figure 6:
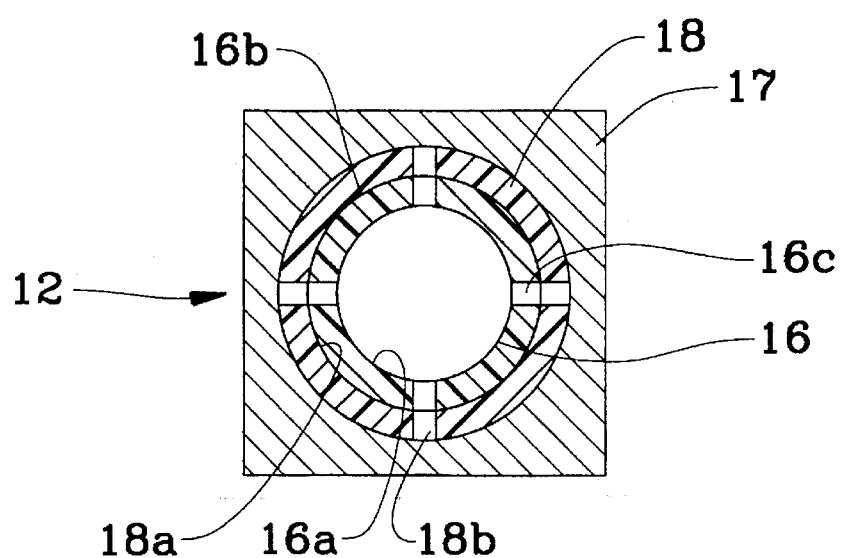
FIG. 6 is a sectional view taken substantially along the section line 6—6 of FIG. 5.
Figure 7:
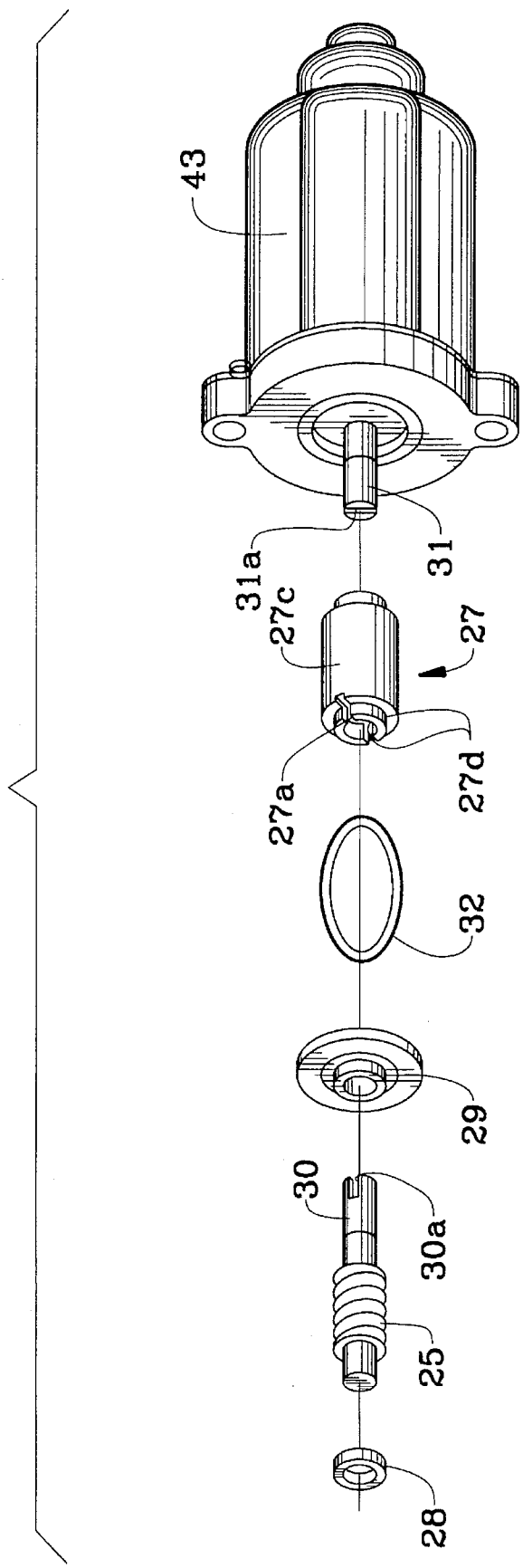
FIG. 7 is a perspective view which shows a connection mechanism between a driving shaft and a driven shaft of an embodiment of a driving apparatus in accordance with the present invention.
Figure 8:
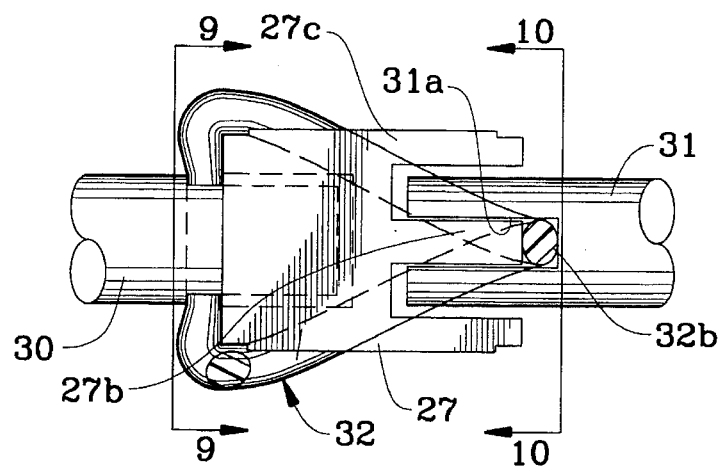
FIG. 8 is a plan view which shows a connection mechanism between a driving shaft and a driven shaft of an embodiment of a driving apparatus in accordance with the present invention.
Figure 9:
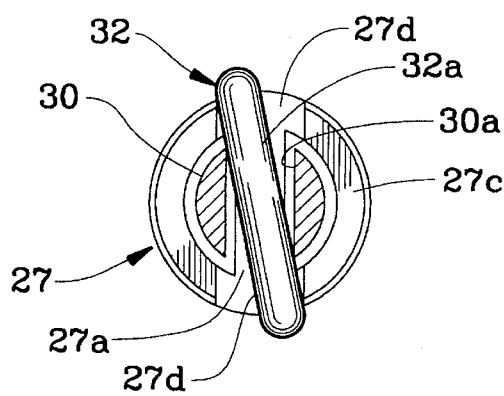
FIG. 9 is a sectional view taken substantially along the line 9—9 of FIG. 8.
Figure 10:
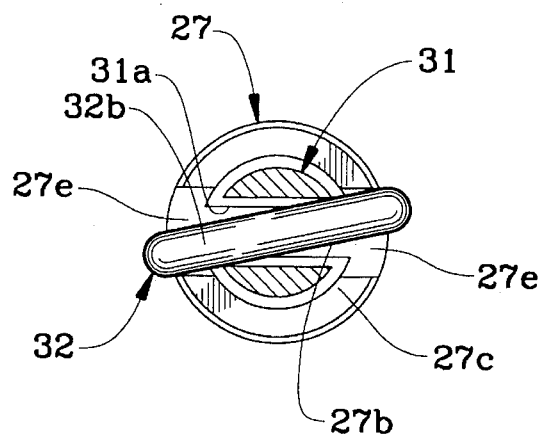
FIG. 10 is a sectional view taken substantially along the line 10—10 of FIG. 8.

Referring to FIGS. 1 to 3, a plate 8 is fixed to the breakaway bracket 2. A screw shaft 9 having a male screw portion 9a at its outer circumferential face is rotatably supported on the plate 8. A link 10 is rotatably supported on the upper bracket 3 by a pin 11. A nut member 12 which is screwed on the screw shaft 9 is rotatably supported on the link 10 by a bolt 36.

Referring to FIGS. 3 to 6, the nut member 12 is constituted by a first main body part 13 and a second main body part 14. The housing 15 which constitutes the first main body part 13 is integrally formed with, by means of a molding process, a screw member 16 provided at its outer circumferential surface with a female screw portion 16a for screwing onto the male screw portion 9a of the screw shaft 9. One end portion of the screw member 16 is axially projected toward the outside of the housing 15 and a taper portion 16b is formed on an outer circumferential face of this projected portion. The taper portion 16b has a conical outer circumferential face. On the taper portion 16b, four slits 16c are axially formed thereon crosswise. In a housing 17 which constitutes the second main body part 14, a slider 18 is disposed therein so as to be able to move in the axial direction. On an inner circumferential face of the slider 18, a taper portion 18a which is able to engage with the taper portion 16b of the screw member 16 is formed thereon. The taper portion 18a has a conical inner circumferential face. On the taper portion 18a, four slits 18b are axially formed thereon crosswise. The slider 18 is always urged by an urging element 20 disposed to the housing 17 toward a direction which the taper portion 18a is engaged with the taper portion 16b of the screw member 16. The screw member 16 and the slider 18 are made of synthetic resin.

The first main body part 13 and the second main body part 14 which are consituted as mentioned above are assembled as follows. The first and second main body parts 13 and 14 are positioned with respect to each other so as to position the taper portion 16b of the screw member 16 in the taper portion 18a of the slider 18, and then both housings 15 and 17 are connected to each other by a screw 22 via a plate 21 which is disposed to the second main body part's 14 side. At this time, the slider 18 and the urging element 20 are pressed in the axial direction by the fastening of the screw 22 so as to strongly engage the taper portion 18a of the slider 18 with the taper portion 16b of the screw member 16. Thereby, a pressing force is applied to the taper portion 16b of the screw member 16 in the diametrical direction by the engagement between the taper portion 16b and the taper portion 18a of the slider 18 and therefore the taper portion 16b of the screw member 16 is deformed toward the axial center so that the engagement between the nut member 12 and the screw shaft 9 screwed on the nut member 12 becomes strong. Accordingly, the engagement condition between the female screw portion 16a of the screw member 16 and the male screw portion 9a of the screw shaft 9 is maintained under the proper condition. As a result, the screw shaft 9 and the nut member 12 are screwed to each other without play and thereby the smooth relative movement between the screw shaft 9 and the nut member 12 is obtained. Now, since the slider 18 is always urged by the urging element 20 toward the direction in which the taper portion 18a is engaged with the taper portion 16b of the screw member 16, even if the female portion 16a of the screw shaft 16 and the male portion 9a of the screw shaft 9 wear over time, the taper portion 16b of the screw member 16 is further deformed in abrasion's degree and therefore the engagement condition between the female screw portion 16a of the screw member 16 and the male screw portion 9a of the screw shaft 9 is maintained under the proper condition.

In case the load is applied to the screw shaft 9 in the axial direction and then is applied to the nut member 12 so as to spread out the screw member 16 in the diametrical direction, the load is absorbed by the frictional force between the taper portion 18a of the slider 18 and the taper portion 16b of the screw member 16 and therefore the slider 18 is not moved in the axial direction by the load. Thereby, it is surely prevented by the slider 18 that the screw member 16 is spread out in the diametrical direction by the load applied to the screw shaft 9 in the axial direction and therefore the engagement between the screw shaft 9 and the nut member 12 does not become weaker. Furthermore, since the load which is applied to the screw shaft 9 in the axial direction hardly acts to the urging element 20, it is unnecessary to increase the urging force of the urging element 20 so as to be able to tolerate this load. Thereby, the engagement between the screw shaft 9 and the nut member 12 does not become strong by the urging force of the urging element 20 beyond the necessary engagement.

On the plate 21 which is disposed to the second main body part's 14 side, a stop member 33 which regulates the relative movement of the nut member 12 in regard to the screw shaft 9 by the rotation of the screw shaft 9 is formed thereon. Furthermore, a plate 34 is disposed to the first main body part's 13 side and a stop member 35 which regulates the relative movement of the nut member 12 in regard to the screw shaft 9 by the rotation of the screw shaft 9 is formed on the plate 34.

As shown in FIG. 1 to FIG. 3, a cover 40 is fixed to the plate 8 so that a space is formed in the inside of the plate 8. One end of the screw shaft 9 extends into this space and a driven gear 41 is fixed to this one end. Furthermore, a rotational shaft 23 is rotatably supported on the plate 8 and the cover 40 and a drive gear 24, which engages with the driven gear 41, is fixed to the rotational shaft 23 so as to rotate together with the rotational shaft 23 in one body. The drive gear 24 is connected with a motor 43 via a reduction mechanism 42 which is disposed in the space. The motor 43 is supported on the breakaway bracket 2.

The reduction mechanism 42 is consituted by a worm-gear 25 and a worm-wheel gear 26. The worm-wheel gear 26 is fixed to the rotational shaft 23 so as to rotate together with the rotational shaft 23 and the drive gear 24 in one body. The worm-gear 25 is engaged with the worm-wheel gear 26 and is connected with the motor 43 via a joint member 27.

As shown in FIG. 7 to FIG. 10, the worm-gear 25 is fixed to a rotational shaft 30 which is rotatably supported on the plate 8 via bushes 28 and 29 and a first groove portion 30a is formed on an end of a portion of the rotational shaft 30 which is connected with the motor 43. Furthermore, a second groove portion 31a is formed on a rotational shaft 31 of the motor 43. On the joint member 27, a first wall portion 27a which is fitted into the first groove portion 30a so as to be able to move in the diametrical direction and which is engaged with the first groove portion 30a is formed thereon. Furthermore, a second wall portion 27b which is fitted into the second groove portion 31a so as to be able to move in the diametrical direction and which is engaged with the second groove portion 31a and which intersects with the first wall portion 27a at right angles is formed on the joint member 27. Now, the rotational shaft 31 corresponds to a driving shaft of the present invention and the rotational shaft 30 corresponds to a driven shaft of the present invention.

The joint member 27 is provided with a side wall 27c which surrounds the engagement portions between the first groove portion 30a and the first wall portion 27a and between the second groove portion 31a and the second wall portion 27b, respectively. On the side wall 27c, a first notch portion 27d which is in succession to the exposed face of the first wall portion 27a and which has a wider width than the first wall portion 27a is formed thereon. Furthermore, a second notch portion 27e which is in succession to the exposed face of the second wall portion 27b and which has a wider width than the second wall portion 27b is formed on the joint member 27. On the outer circumference of the joint member 27, a ring shaped rubber cushion 32 is disposed thereon so as to be wound around the side wall 27c under the twisted condition. The rubber cushion 32 is engaged with the first notch portion 27d and the second notch portion 27e and is provided with a first urging portion 32a and a second urging portion 32b. The first urging portion 32a is disposed on the exposed face of the first wall portion 27a under the condition which is shifted by a predetermined angle in regard to the first wall portion 27a. The second urging portion 32b is disposed on the exposed face of the second wall portion 27b under the condition which is shifted by a predetermined angle in regard to the second wall portion 27a. The rubber cushion 32 corresponds to an urging member of the present invention.

In the above mentioned structures, the first wall portion 27a is fitted into the first groove portion 30a and is engaged with the first groove portion 30a. Thereby, the rotational shaft 30 is connected with the joint member 27. On the other hand, the second wall portion 27b is fitted into the second groove portion 31a and is engaged with the second groove portion 31a. Thereby, the rotational shaft 31 is connected with the joint member 27. As a result, the rotational shaft 30 is connected with the rotational shaft 31 via the joint member 27. Thereby, torque is transmitted from the rotational shaft 30 to the rotational shaft 31 by the engagement between the first wall portion 27a and the first groove portion 30a and the engagement between the second wall portion 27b and the second groove portion 31a. Simultaneously, the eccentricity between the rotational shaft 30 and the rotational shaft 31 is absorbed by the movement of the first wall portion 27a in the diametrical direction in the first groove portion 30a and by the movement of the second wall portion 27b in the diametrical direction in the second groove portion 31a. At this time, the first urging portion 32a of the rubber cushion 32 is disposed between the exposed face of the first wall portion 27a and the bottom face of the first groove portion 30a and the joint member 27 is always urged by the first urging portion 32a in the axial and rotational direction in regard to the rotational shaft 30. Thereby, the vibration between the rotational shaft 30 and the joint member 27 is effectively absorbed and therefore it is reliably prevented that the uncomfortable noise and so on is generated between the rotational shaft 30 and the joint member 27. On the other hand, the second urging portion 32b of the rubber cushion 32 is disposed between the exposed face of the second wall portion 27b and the bottom face of the second groove portion 31a and the joint member 27 is always urged by the second urging portion 32b in the axial and rotational direction in regard to the rotational shaft 31. Thereby, the vibration between the rotational shaft 31 and the joint member 27 is effectively absorbed and therefore it is reliably prevented that the uncomfortable noise and so on is generated between the rotational shaft 31 and the joint member 27. As mentioned above, since the vibration between the rotational shafts 30, 31 and the joint member 27 is absorbed by one rubber cushion 32 having a ring-shape, there is a small number of parts of the driving apparatus in this embodiment. Therefore, this embodiment is of great advantage in decreasing the manufacturing costs and the manufacturing steps.

The above-described embodiment of the driving apparatus operates as follows. Referring to FIG. 1, when the motor 43 is driven, the screw shaft 9 is rotated by the driving torque of the motor 43 via the rotational shaft 31, the joint member 27, the rotational shaft 30, the reduction mechanism 42, the drive gear 24 and the driven gear 41. Thereby, the nut member 12 is relatively moved in the axial direction in regard to the screw shaft 9, and then the upper bracket 3 and the upper main shaft 6 are rotated around the pin 4 and the universal-joint in regard to the breakaway bracket 2 and the lower main shaft 5 by the relative movement of the nut member 12. Thereby, the position of the steering wheel 7 is adjusted as shown in FIG. 1 by two dotted lines.

As mentioned above, according to the present invention, since the joint member rotates under the condition which is urged by the urging member in the axial and rotational direction in regard to the driving shaft and the driven shaft and transmits the torque from the driving shaft to the driven shaft, it is able to effectively absorb the vibration between the driving shaft and the driven shaft by the urging member and therefore it is able to prevent the generation of the uncomfortable noise and so on due to the vibration.

Furthermore, according to the present invention, since the joint member is urged by one rubber cushion in the axial and rotational direction in regard to the driving shaft and the driven shaft, it is able to reduce the number of parts of the driving apparatus and therefore it is able to reduce the manufacturing costs and the number of manufacturing steps.

The principles, a preferred embodiment and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A driving apparatus comprising:

a driving shaft which is linked to a driving member, a driven shaft which is linked to a driven member, a joint member which connects the driving shaft with the driven shaft so that torque is transmitted from the driving shaft to the driven shaft, the joint member having first and second ends, a first groove portion formed on one of the driven shaft and the first end of the joint member, a first wall portion formed on the other one of the first end of the driven shaft and the joint member and movably fitted into the first groove portion in the diametrical direction and engaged with the first groove portion, a second groove portion formed on one of the second end of the driving shaft and the joint member, a second wall portion formed on the other one of the second end of the driving shaft and the joint member and movably fitted in the second groove portion in the diametrical direction and engaged with the second portion, a ring-shaped urging member disposed on the joint member for urging the joint member in the axial and rotational direction with respect to the driven shaft and the driving shaft, said urging member being wound around the joint member in a twisted manner to provide a first urging portion disposed at an exposed face of the first wall portion and a second urging portion disposed at an exposed face of the second wall portion, said first urging portion being shifted by a predetermined angle with respect to the first wall portion and said second urging portion being shifted by a predetermined angle with respect to the second wall portion.

2. A driving apparatus comprising:

a driving shaft for being connected to a driving member;

a driven shaft for being connected to a driven member;

a joint member connecting the driving shaft to the driven shaft so that torque is transmitted from the driving shaft to the driven shaft, said joint member having oppositely positioned first and second end portions, said driving shaft having a first end portion that engages the first end portion of the joint member, said driven shaft having a first end portion that engages the second end portion of the joint member; and a ring-shaped urging member disposed on the joint member for urging the joint member in the axial and rotational direction with respect to the driven shaft and the driving shaft, said urging member being wound around the joint member in a twisted configuration so that a first urging portion of the urging member is positioned between an end face at the first end portion of the driving shaft and an end face at the first end portion of the joint member and so that a second urging portion of the urging member is positioned between an end face at the first end portion of the driven shaft and an end face at the second end portion of the joint member.

* * * * *